Sept. 26, 1967  D. WULFSON  3,344,041
MULTISTAGE FLASH DISTILLATION OF SALINE WATER
Filed Dec. 18, 1964  2 Sheets-Sheet 1

Sept. 26, 1967     D. WULFSON     3,344,041

MULTISTAGE FLASH DISTILLATION OF SALINE WATER

Filed Dec. 18, 1964     2 Sheets-Sheet 2

Inventor
Dov Wulfson
By Alvin Browdy
Attorney

United States Patent Office 3,344,041
Patented Sept. 26, 1967

3,344,041
MULTISTAGE FLASH DISTILLATION OF
SALINE WATER
Dov Wulfson, 30 Kaf-Gimel St., Kiriat Haim, Israel
Filed Dec. 18, 1964, Ser. No. 419,507
Claims priority, application Israel, Dec. 20, 1963,
20,487/63
3 Claims. (Cl. 203—11)

ABSTRACT OF THE DISCLOSURE

The invention relates to distillation processes and particularly to multistage flash distillation processes for use in the desalination of saline water, the invention particularly residing in a method for carrying out the flash distillation by dividing the feed stream to be distilled into a first portion which is adapted to be heated by an external heat source to a predetermined elevated temperature and then to be passed to the first stage of the multistage evaporator, and into a plurality of remaining streams corresponding in number to the number of remaining stages of the flash evaporator system, the streams being respectively discharged into the remaining stages of the system, at least a portion of the solution discharged in each stage being subjected to flash evaporation therein, each stream prior to its discharge in a stage being subjected to heat exchange with the condensate from the preceding stage.

---

Figure 1:
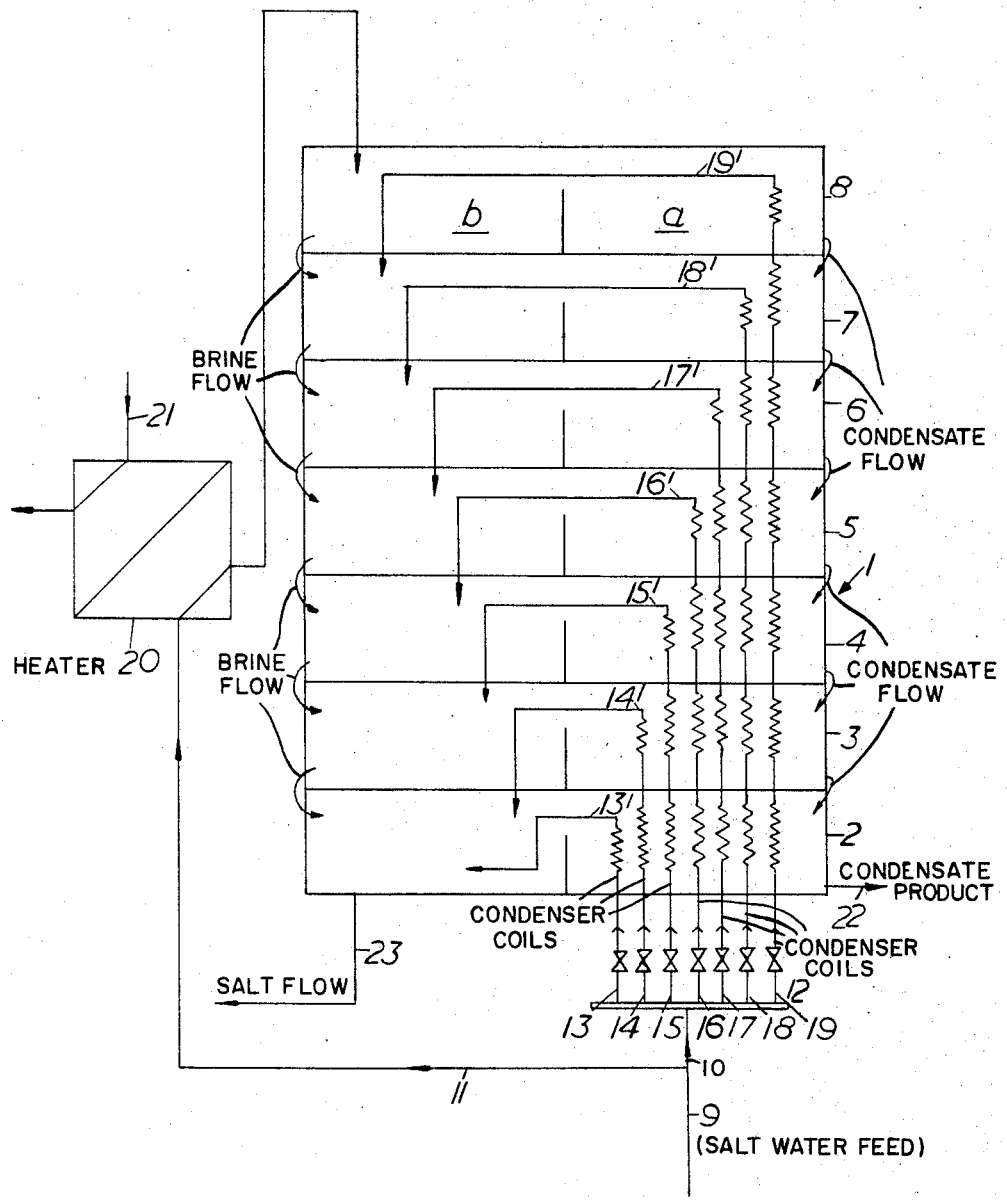

Various processes have been proposed and used in connection with the desalination of saline water including distillation processes. It is well known, however, that economic considerations, particularly as concerns the power required in the provision of the heat source necessary for distillation, render most of these proposals expensive to carry out. It has, from time to time, been proposed that waste or natural heat sources be used in this connection. Suitable waste-heat sources are available at or near industrial centres in the form, for example, of cooling water used to cool industrial installations such as refineries, chemical, petrochemical metallurgical plants, steel mills, etc. Suitable natural heat sources includes solar heat.

Prior proposals to utilize such waste-heat sources have encountered considerable difficulties, particularly in effecting an adequate heat exchange between the cooling liquid and the feed-liquid to be distilled. Thus, it will be readily understood that, in order to effect distillation, the feed liquid must be raised to a substantial elevated temperature. Where, however, considerable quantities of feed liquid are involved, there is a basic limit to the capacity of the cooling liquid to heat the feed liquid sufficiently.

One way of overcoming this difficulty would be to subject the feed liquid to pre-heating before causing it to pass in heat exchange with the cooling liquid. Such a procedure would ensure the heating of the feed liquid to a sufficiently high temperature but it would also involve introducing the feed liquid into the heat exchanger at a relatively elevated temperature. In addition to the economic considerations involved in providing such pre-heating it should be borne in mind that an important purpose of passing the cooling liquid through the heat exchanger is to cool it sufficiently so as to render it suitable for further cooling of the installation in which it is used. If now the feed liquid is passed into the installation at a relatively elevated temperature, the cooling liquid will not be sufficiently cooled.

It is an object of the present invention to provide a new and improved process for the distillation of a solution in which waste or natural heat sources can be effectively employed and by means of which the above referred to disadvantages are avoided.

According to the present invention there is provided a method of effecting the distillation of a solution comprising the steps of directing a portion of the incoming solution through a heat exchanger where it is heated by an external heat source to a predetermined elevated temperature and is passed to the first stage of an evaporator having $n$ stages, the pressure in the evaporator decreasing from stage to stage, separating the remainder of the incoming solution into $(n-1)$ streams to be discharged respectively into the $(n-1)$ remaining stages, at least a portion of the solution discharged in each stage being subjected to flash evaporation therein, the vapours thereby produced being condensed to form a condensate, each of the $(n-1)$ streams, prior to discharging into a stage being subjected to heat exchange with the condensate from the preceding stage.

Two embodiments of processes in accordance with the present invention and apparatus for carrying out the processes will now be described by way of example and with reference to FIGURES 1 and 2 of the accompanying drawings.

As seen in FIGURE 1 of the drawings, a multistage evaporator 1 comprises seven separate evaporator stages, 2, 3, 4, 5, 6, 7 and 8, each stage having two component chambers $a$ and $b$. An incoming stream 9 of sea water is divided into two component streams 10 and 11, the stream 10 is led to a distribution drum 12. In the distribution drum 12 the stream 10 is divided into seven component streams 13, 14, 15, 16, 17, 18 and 19. The streams 14 to 19 are led by suitable ducting 14′ and 19′, so as respectively to discharge in the stages 2 to 7. The component stream 13 is led by ducting 13′ into the stage 2.

The component stream 11 passes through a main heat exchanger 20 and, in its heated state is discharged into the stage 8. The heat exchanger 20 is used, for example, to cool a stream 21 of cooling water used, for example, in the cooling of a separate installation. The seven evaporator stages 2 to 8 are maintained at differing sub-atmospheric pressures which increase from chamber to chamber, the lowest pressure to be found in the chamber 2 and the highest in chamber 8.

In operation, the component stream 11 is fed into the heat exchanger 20 at a relatively low temperature and emerges therefrom at a relatively elevated temperature. As the heated stream 11 emerging from the heat exchanger 20 enters the sub-atmospheric stage 8 a portion thereof is subjected to flash evaporation, the evaporated vapours then condensing on the conduit 19′, the latent heat of condensation serving to heat the water flowing through this conduit 19′.

The condensed vapour (sweetened water) collects in the compartment 8$a$, whilst the unevaporated relatively concentrated brine collects in the compartment 8$b$. This brine passes into the succeeding stage 7 as does the sea water in the conduit 19′ which has been heated as a result of the condensation thereon of the vapours produced in the stage 8 and in the succeeding stages 7 to 2. At the same time condensate which is collected in the compartment 8$a$ passes into succeeding compartment 7$a$. The liquid (i.e. the brine on the one hand and the condensed water on the other) entering the stage 7 is subject to flash evaporation, the vapours condensing on the conduits 18′ and 19′ and the condensed vapours collecting in the compartment 7$a$ whilst the concentrated brine collects in the compartment 7$b$. This procedure continues through the stages 6, 5, 4, 3 and 2 and in this final stage there collects in the compartment 2$a$, the final sweetened water product which is removed through an outlet 22 and a final concentrated brine product is removed from an outlet 23.

In the compartment 2 the conduit 13′ through which passes the stream 13 serves for the condensation thereon of the vapour which is evaporated from the stream 14 in the compartment 2.

In one characteristic example, the incoming stream 9 of feed sea water was at a temperature of 25° C. The component stream 11 which entered the heat exchanger 20 at a temperature of 25° C. emerged therefrom at a temperature of 85° C. it having undergone heat exchange with a stream of cooling water 21 which entered the heat exchanger 20 at a temperature of 90° C. and was cooled therein to a temperature of 30° C.

The stages 2, 3, 4, 5, 6, 7 and 8 were respectively maintained at pressures of 0.06; 0.088; 0.125; 0.176; 0.243; 0.331 and 0.445 atmospheres. The water flowing through the conduits 14′ and 19′ emerges into the stages 2 to 7 at temperatures which are respectively 39° C., 46° C., 53° C., 60° C., 67° C. and 74° C. The water flowing through the conduit 13 flows into the sea water of the compartment 2b with a temperature 32° C. and mixes there with the brine. The resulting sweetened water emerges from the outlet 22 at a temperature of 36° C. whilst the temperature of the concentrated brine emerging from the outlet 23 is about 35° C.

The incoming stream 9 is divided into the two component streams 10 and 11 in the proportion 1:4.5.

Whilst, in the embodiment described above, the incoming streams of sea water are heated by being passed through ducts on which the vapours condense, in an alternative arrangement the provision of surfaces for condensation is dispensed with and in its place the sweet water condensate is pumped from each stage to the preceding stage and the introduction of this water, as a spray, into a stage at a temperature below the temperature of that stage results in the condensation on this sweet water of the vapours in that stage.

Figure 2:
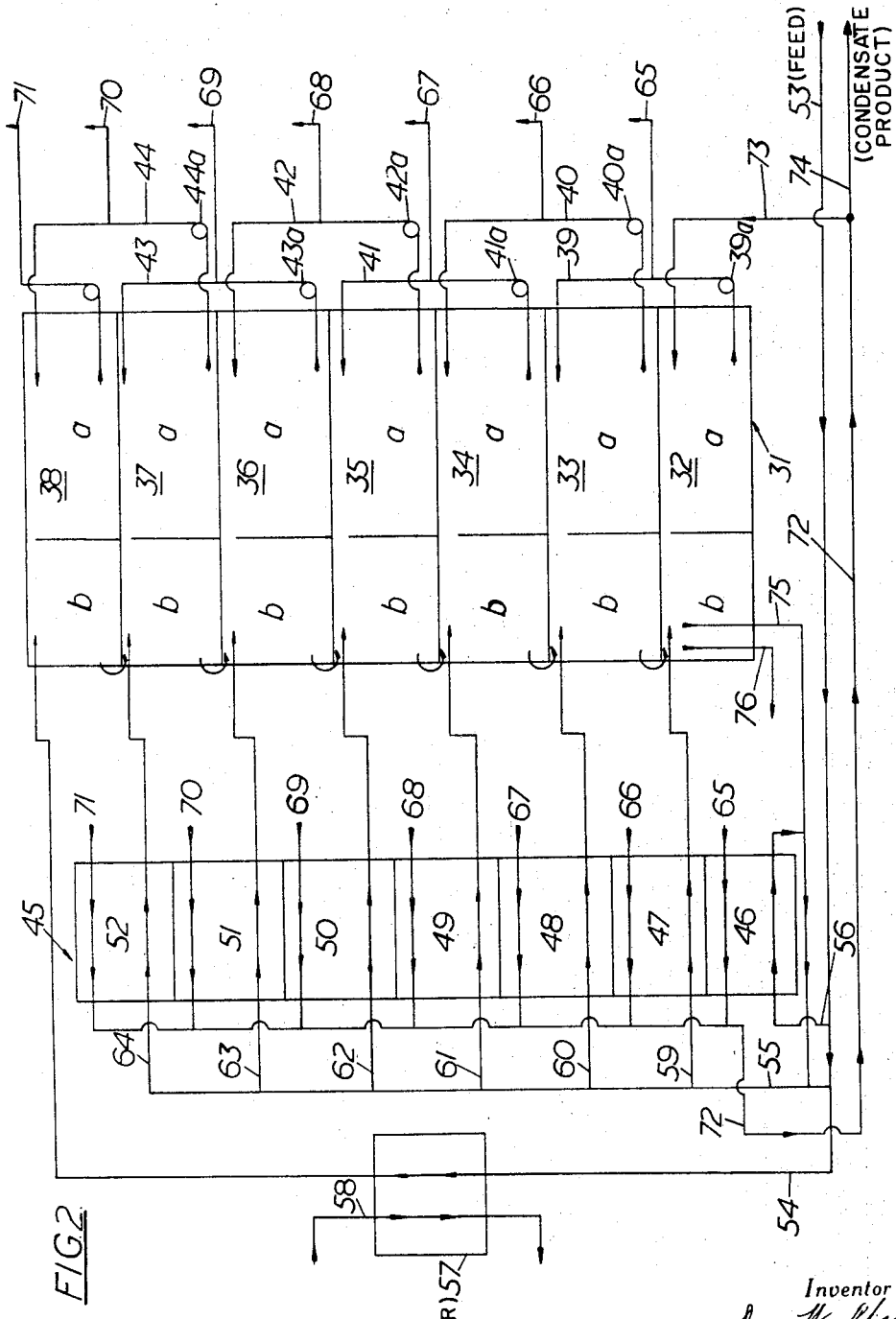

Such an arrangement is schematically illustrated in FIG. 2 of the drawings where a multi-stage evaporator 31 comprises seven separate evaporator stages 32, 33, 34, 35, 36, 37 and 38, each stage having two component chambers a and b. Successive stages are coupled together by ducting and a pump so that the sweet water condensate which accumulates in the lower portion of the compartment a of one stage together with the condensate which has been pumped into that stage from the succeeding stage are pumped to the upper portion of the compartment a of the preceding stage. Thus the compartments b of stages 32 and 33 are coupled together by ducting 39 and pump 39a, stages 33 and 34 by ducting 40 and pump 40a, stages 34 and 35 by ducting 41 and pump 41a, stages 35 and 36 by ducting 42 and pump 42a, stages 36 and 37 by ducting 43 and pump 43a, and stages 37 and 38 by ducting 44 and pump 44a.

The evaporator 31 is associated with a liquid-liquid heat exchange assembly 45 comprising seven component heat exchangers 46 to 52 inclusive.

An incoming stream of sea water 53 is divided into three component streams 54, 55 and 56. The component stream 54 passes through a main liquid-liquid heat exchanger 57 and, in its heated state, is discharged into the compartment chamber b of the stage 38 of the evaporator 31. The heat exchanger 57 is used, for example, to cool a stream 58 of cooling water used, for example, in the cooling of a separate installation. The stream 56 passes through the heat exchanger 46 and in its consequently heated state joins the more concentrated brine stream 75 and the stream 55 which is divided into six component streams 59 to 64 which pass respectively through the heat exchangers 47 to 52 into the stages 32 to 37 in which flash evaporation takes place. A portion of each of the sweet water condensate streams which are pumped from each stage to the preceding stage are separated out into six respective streams 65 to 70 inclusive whilst a further stream 71 is pumped out of the final stage 38. The streams 65 to 71 are respectively passed through the heat exchangers 46 to 52 in countercurrent with the sea water passing therethrough. The streams 65 to 71 of condensate after passing through the heat exchangers combine into a single sweet water stream 72 which is divided into two streams 73 and 74. Stream 73 is introduced into the stage 32 where it serves to condense the vapours therein whilst stream 74 is removed from the system as the final fresh water product. Each of the seven evaporator stages 32 to 38 are maintained at differing sub-atmospheric pressures which increase from chamber to chamber, the lowest pressure is found in the chamber 32 and the highest in the stage 38.

In operation the component stream 54 is passed into heat exchanger 57 at a relatively low temperature and emerges therefrom at a relatively elevated temperature. The thus heated stream 54 discharges into the chamber b of the stage 38 and is subjected to flash evaporation. The evaporated vapours condense in the chamber 38a on the cooler sweetened water condensate which is pumped into this chamber through the ducting 44 and pump 44a from the stage 37. At the same time sweetened water condensate from the stage 38 is pumped through the conduit 71 into the heat exchanger 52 where it exchanges heat with the water stream 64, the thus heated water stream 64 being discharged into the stage 37. The sea water stream 64 which is discharged into the stage 37 and which has been heated in heat exchange with the condensate from the preceding stage 38 is subjected to flash evaporation, the vapours condensing on the cooler condensate which is pumped into the stage 37 via the conduit 43 from the succeeding stage 36.

This procedure is repeated until, in the final stage 32, sea water is introduced in the stream 59 which has been heated in the heat exchange with the condensate stream 66 originating from the preceding stage 33 and which is subjected to flash evaporation, the vapours condensing on the sweet water condensate pumped into the stage from the sweet water stream 73.

Salt water which accumulates in the chamber b of the successive stages passes down from stage to stage so that in the final stage 32 part of the accumulated salt water is removed via a conduit 75 and joins the water stream 56 and 55 and the remainder is removed via a blow down conduit 76.

The arrangement just described enjoys the particular advantage that there is not required for the condensation of the vapours any solid heat transmitting surface but that condensation takes place on the cooler sweetened water condensate itself. Furthermore, heat exchange both in the composite exchange unit 45 and in the main heat exchanger 57 is effected by direct liquid-liquid heat exchange thereby obviating the use of heat exchange surfaces and considerably increasing the efficiency of the heat exchange itself. Various heat exchange media can be employed in the heat exchanger 57, such as hydrocarbon oils and isobutane. Such media are, of course, non-immiscible in the water.

In one characteristic example the incoming stream 53 of feed sea water was at a temperature of 25° C. This stream combined with the stream 56 which had been heated in the heat exchanger 46 and was at a temperature of 32° C. and with the outlet stream 75 emerging from the stage 32 which was at a temperature of 36° C. The resulting temperature of the stream 55 and the component streams 59 to 64 as they respectively entered the heat exchangers 47 to 42 was 28° C. After heat exchange the feed water streams 64 to 59 entered the stages 37 to 32 at temperatures of 77°, 70°, 63°, 56°, 49° and 42° C. The component stream 54 on the other hand which entered the heat exchanger 57 at a temperature of 25° was heated to a temperature of 85° C. at which temperature it was discharged into the stage 38. The stages 38 to 32 were maintained at pressures of 0.45, 0.331, 0.243, 0.176, 0.125, 0.088 and 0.06 atmospheres respectively. The sweetened water condensate emerging from the stages 38 to 32 did so at temperatures of 78°, 71°, 64°, 57°, 50°, 43° and 36° respectively. The outgoing sweet water was discharged at a temperature of 29° C.

With an installation, as described above, effective use can readily be made of waste-heat sources for the sweetening of saline water by distillation. By virtue of the fact that only a portion of the incoming feed water is passed in heat exchange with the waste-heat source, this portion can be effectively heated from a relatively low temperature, say 25° C., to a high temperature, say 85° C., and so, where the heat source with which the heat exchange takes place is constituted by a cooling liquid the latter can be effectively cooled. This, of course, would not be the case where the entired quantity of the feed water was passed in heat exchange with cooling liquid.

Whilst in the examples given above, a seven stage evaporator has been described, different numbers of stages operating under differing conditions of temperature and pressure can be effectively employed. Furthermore, the method described above is not limited to being carried out in an evaporator or a heat exchanger as specifically described above but can be carried out with various forms and types of apparatus with different sources of waste or natural heat and for distillation processes employing differing solutions.

I claim:
1. A method of effecting the distillation of a solution comprising the steps of directing a portion of the incoming solution through a heat exchanger where it is heated by an external heat source to a predetermined elevated temperature and is passed to the first stage of an evaporator having $n$ stages, the pressure in the evaporator decreasing from stage to stage, separating the remainder of the incoming solution into ($n-1$) streams to be discharged respectively into the ($n-1$) remaining stages, at least a portion of the solution discharged in each stage being subjected to flash evaporation therein, the vapours thereby produced being condensed to form a condensate, each of the ($n-1$) streams, prior to discharging into a stage being subjected to heat exchange with the condensate from the preceding stage.

2. A method according to claim 1, wherein each of the ($n-1$) streams, prior to discharging, passes through the stage preceding that stage into which it is to be discharged.

3. A method according to claim 1, wherein condensate is passed from each stage except the $n$th stage, to the preceding stage and a portion thereof is bled off in heat exchange with that stream of the solution to be discharged into the succeeding stage.

References Cited

UNITED STATES PATENTS

| | | | |
|---|---|---|---|
| 2,803,589 | 8/1957 | Thomas | 202—185.2 |
| 2,908,618 | 10/1959 | Bethon | 202—174 |
| 3,119,752 | 1/1964 | Checkovich | 203—11 |
| 3,152,053 | 10/1964 | Lynam | 202—173 |
| 3,165,452 | 1/1965 | Williams | 203—11 |
| 3,218,241 | 11/1965 | Checkovich | 203—11 X |
| 3,219,554 | 11/1965 | Woodward | 203—11 X |
| 3,257,290 | 5/1966 | Starmer | 203—11 X |

OTHER REFERENCES

Symposium Nat. Academy of Sciences, Washington, D.C. "Saline Water Conversion" (1958), Office of S.W. Dept. of Interior U.S. pp. 91, 92 & 93.

NORMAN YUDKOFF, *Primary Examiner.*

F. E. DRUMMOND, *Assistant Examiner.*